Oct. 30, 1962 P. J. H. JANSSEN ETAL 3,061,674

CIRCUIT ARRANGEMENT FOR USE IN TELEVISION RECEIVERS

Filed April 8, 1960 3 Sheets-Sheet 1

INVENTORS
PETER JOHANNES HUBERTUS JANSSEN
WOUTER SMEULERS
KARL EISELE
BY [signature]
AGENT

CIRCUIT ARRANGEMENT FOR USE IN TELEVISION RECEIVERS

Filed April 8, 1960 3 Sheets-Sheet 2

INVENTORS
PETER J.H. JANSSEN
WOUTER SMEULERS
KARL EISELE
BY
AGENT

CIRCUIT ARRANGEMENT FOR USE IN TELEVISION RECEIVERS

INVENTORS
PETER J.H. JANSSEN
WOUTER SMEULERS
KARL EISELE
BY
AGENT

United States Patent Office 3,061,674

Patented Oct. 30, 1962

3,061,674

CIRCUIT ARRANGEMENT FOR USE IN TELEVISION RECEIVERS

Peter Johannes Hubertus Janssen and Wouter Smeulers, Eindhoven, Netherlands, and Karl Eisele, Krefeld, Germany, assignors to North American Philips Company, Inc., New York, N.Y., a corporation of Delaware Filed Apr. 8, 1960, Ser. No. 21,054

Claims priority, application Netherlands Apr. 29, 1959

3 Claims. (Cl. 178—69.5)

Figure 1:
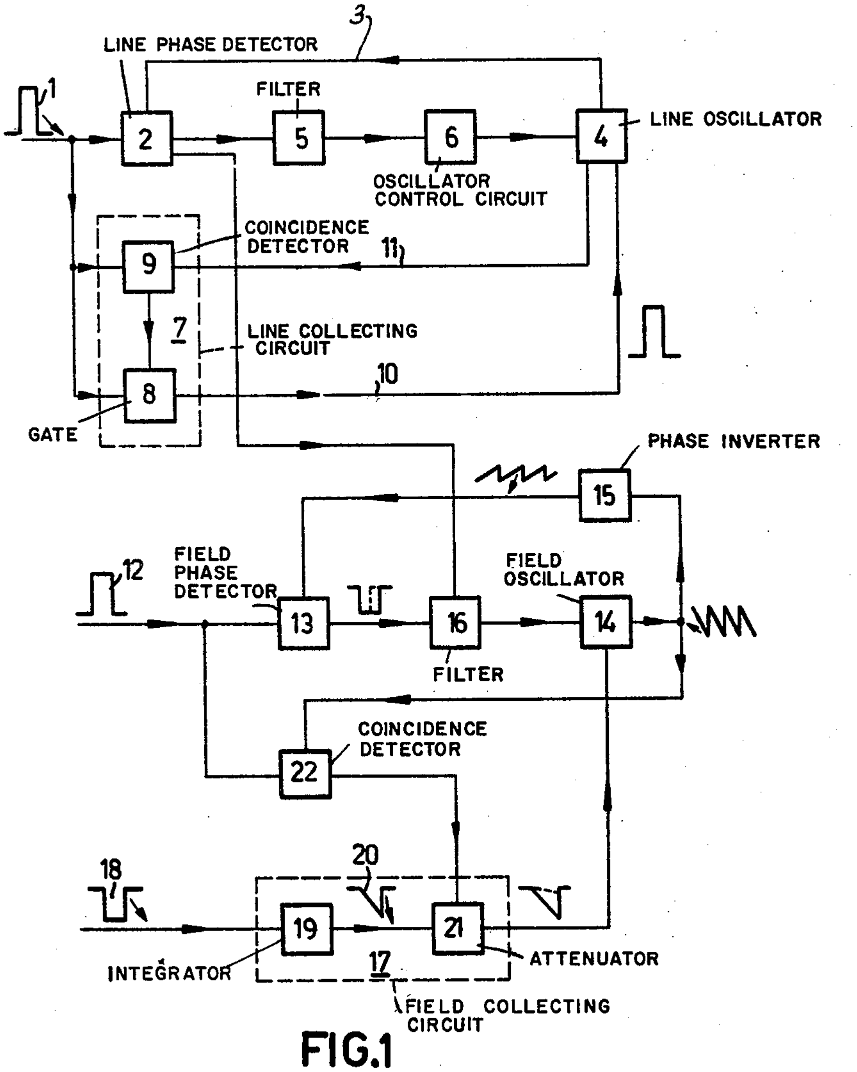

This invention relates to circuit arrangements for use in television receivers comprising an automatic line synchronising device, constituted by a line phase detector $L\phi$ and a line collecting circuit $L_1$, and an automatic picture synchronising device constituted by a field phase detector $B\phi$ and a picture collecting circuit $B_1$.

In the modern television receiving technique, the aim is to make the device for synchronizing the line oscillator and the device for synchronizing the field oscillator both fully automatic.

For this purpose, in total circuits are required in the receiver, namely:

(1) A line phase detector $L\phi$ which is active substantially in the state of synchronization.

(2) A line collecting circuit $L_1$ which converts a state of non-synchronization under any conditions into a state of synchronization.

(3) A field phase detector $B\phi$ which is preferably so designed as to assist the direct synchronization action.

(4) A field collecting circuit $B_1$ which converts a state of non-synchronization under any conditions into a state of synchronization.

Now, in circuits which do not operate fully automatically, it is well-known, to mount the two potentiometers for controlling the frequencies of the line oscillator and the field oscillator on one shaft so that the frequencies of both the field oscillator and the line oscillator can be controlled by rotating the said shaft.

This is based upon recognition of the fact that, at the transmitter end, the field synchronising signals and the line synchronising signals are derived from oscillators coupled together via divisional circuits. If, therefore, the frequency of the line synchronising signal varies, the frequency of the field synchronising signal undergoes a proportional variation. However, in this case, no allowance has been made for the fact that the oscillators in the receiver may have a certain frequency drift. Particularly if the line oscillator is designed as a sine oscillator and the field oscillator is designed as a relaxation oscillator, the drift of the latter may be much greater than that of the former.

Operation by means of one shaft is then impossible since due to the difference between the drifts of the two oscillators, the initial adjustment of the two potentiometers, which is based upon a proportionality factor determined by the transmitted signal, is insufficient, especially in the limiting cases between the state of non-synchronization and the state of synchronization, to adjust the correct frequency for both the line oscillator and the field oscillator in any case occurring.

However, in fully automatic synchronising devices of the kind above described, it is possible to make successful use of this principle, and the circuit according to the invention for this purpose is characterized in that a direct voltage derived from the line phase detector $L\phi$ is applied either directly, or through the field phase detector $B\phi$, to the picture oscillator.

The circuit according to the invention then affords the advantage of providing a proportional variation in the frequency of the field oscillator if the line synchronizing frequency is varied (change of transmitter). The drift of the field oscillator is then compensated by the own phase detector $B\phi$. The field synchronizing system so far as it regards the direct synchronization, is then maintained in the optimum range of phases (approximately from ¼ to ⅓ of the maximum phase variation possible) so that in any case occurring the optimum insensitivity to interference is obtained and so-called "rolling" of the image in a vertical direction due to disappearance of one or more field synchronising pulses is avoided.

Figure 2:
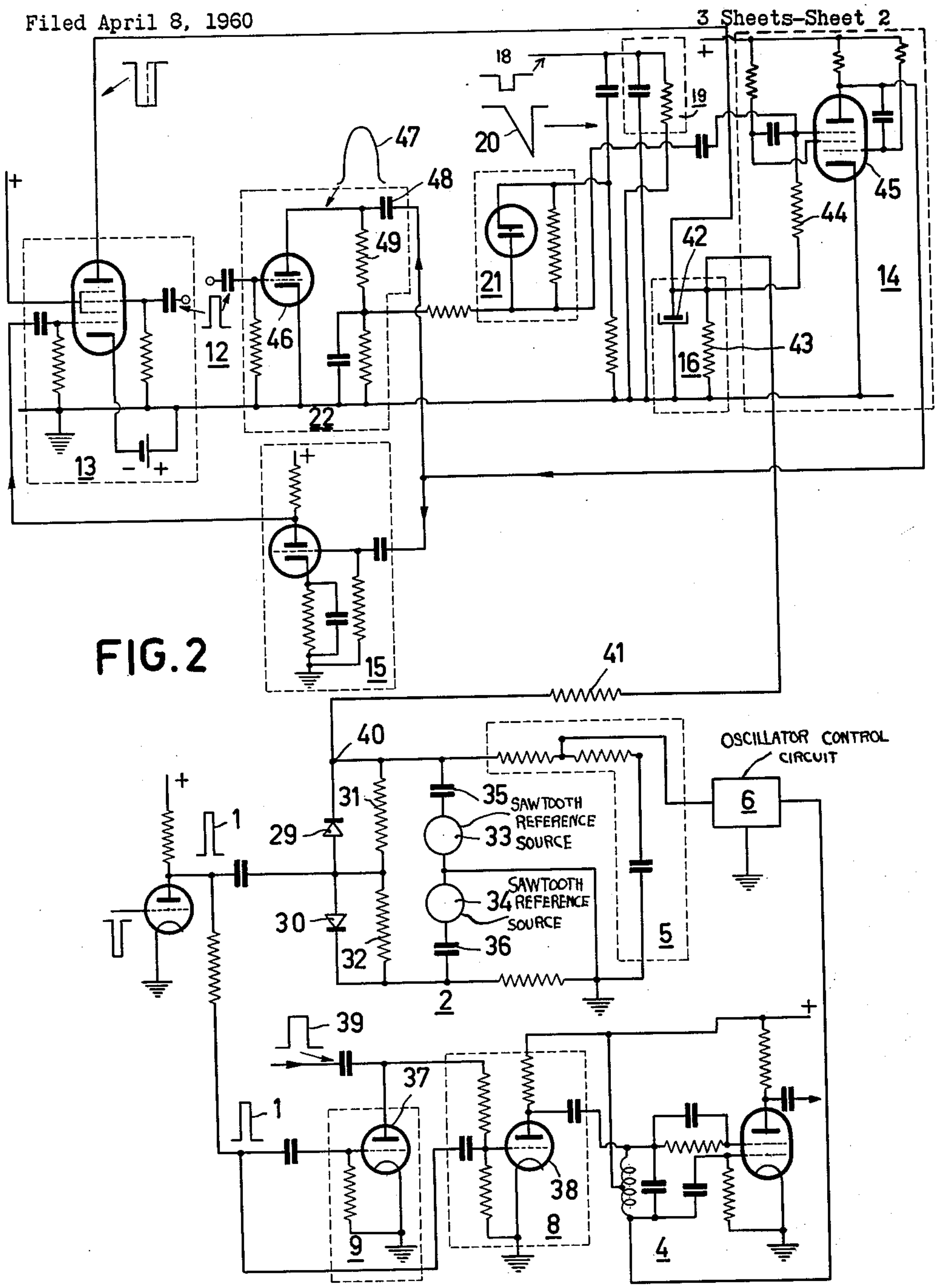
Figure 3:
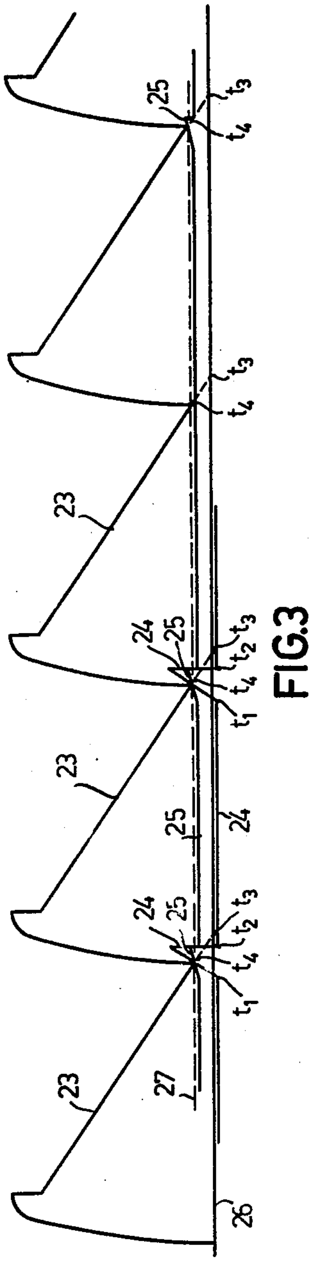
Figure 4:
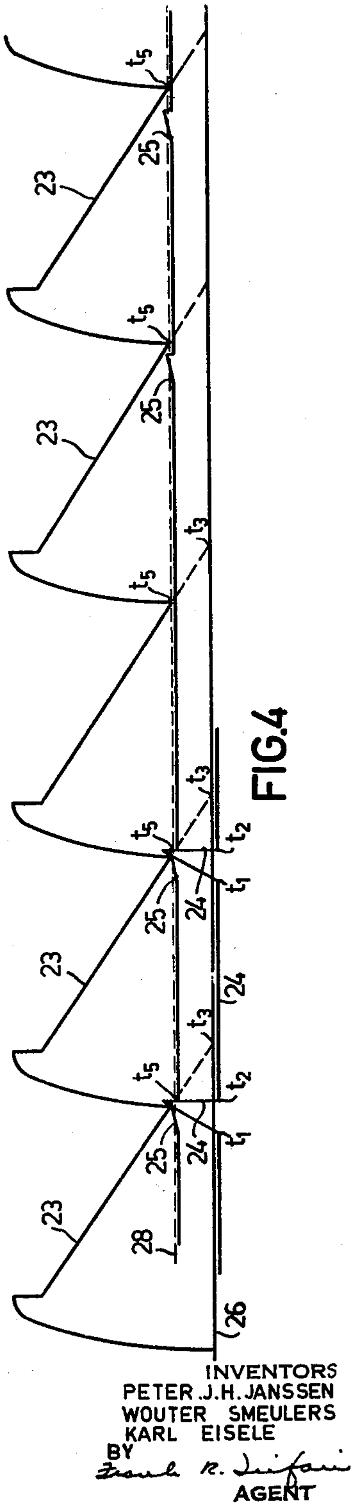

In order that the invention may be readily carried into effect, one embodiment thereof will now be described in detail by way of example, with reference to the accompanying drawings, in which:

FIG. 1 shows the block diagram and FIG. 2 a possible wiring diagram of the circuit;

FIGS. 3 and 4 serve for clarification.

In FIG. 1, line synchronizing pulses 1 are supplied to the line phase detector $L\phi$, which is indicated by 2. The phase detector 2 obtains, through a lead 3, a reference signal derived from a line oscillator 4, so that the output voltage of phase detector 2, which is smoothed substantially into a direct voltage in a smoothed network 5, is a measure of the deviation of the oscillator signal with respect to the line synchronising signal. The direct voltage obtained from 5 is applied to a control circuit 6 which permits of controlling the line oscillator. If the oscillator 4 is a sine oscillator, the control circuit 6 may be a reactance circuit.

The line synchronizing signal 1 is also supplied to the line collecting circuit $L_1$, which is indicated by 7. The line collecting circuit 7 comprises a gate circuit 8 which is controlled from a coincidence detector 9 in a manner known per se. This control is effected in a manner such that the gate 8 is opened in the state of non-synchronization and closed in the state of synchronization so that in the state of non-synchronisation the line synchronising pulses 1 can be supplied through a lead 10 for direct synchronization to the oscillator 4. The coincidence detector 9 has supplied to it the line synchronizing pulses 1 and, through a lead 11, a reference signal derived from the oscillator 4.

Likewise in FIG. 1, square field synchronizing pulses 12 are supplied to the field phase detector $B\phi$, which is indicated by 13. The phase detector 13 receives a reference signal which is derived from a field oscillator 14 and which is inverted in phase in a phase-inverting device 15 so that the output voltage of 13, after having been smoothed substantially into a direct voltage in a smoothing network 16, is applied as a control voltage to the oscillator 14. In the example under consideration, the oscillator 14 is of the Miller-Transitron type to which a negative control voltage is to be applied. The output signal of 13 is therefore a negative pulse having a duration which is dependent upon the phase difference between the synchronizing signal and the oscillator signal.

The picture synchronizing pulses are also supplied to the field collecting circuit $B_1$, which is indicated by 17. The Miller-Transitron oscillator must have supplied to it negative synchronizing pulses so that the polarity of the field synchronizing pulses 18 supplied to 17 must also be negative.

The field synchronizing pulses 18 are supplied to an integrating network 19 which is associated with the field collecting circuit 17 and which has set up at its output the triangular synchronizing pulses 20 required for satisfactory performance. The synchronizing pulses 20 are supplied through an attenuator 21 associated with 17, for direct synchronization to the field oscillator 14.

It will be evident that, if instead of a Miller-Transitron oscillator, another type of relaxation oscillator is used, neither the pulse obtained from 13, nor the field synchronizing pulse 18 need be negative.

In the state of synchronization, the synchronizing pulses 20 are attenuated since from an associated coincidence detector 22 there is obtained an output voltage which controls the attenuator 21. For this purpose, the field synchronizing pulses 12 and a reference signal derived from oscillator 14 are applied to the coincidence detector 22.

According to the principle of the invention, the output voltage of the line phase detector 2 is applied to the smoothing network 16 of the field synchronizing device.

In order to clarify the advantage thus obtained, the operation of the described field synchronizing device, without the step taken in accordance with the invention, will now be described with reference to FIGS. 3 and 4.

In FIG. 3, a curve 23 shows the sawtooth signal produced by the oscillator 14. A curve 24 shows the integrated field synchronizing signal which would be active without the action of attenuator 21. A curve 25 shows the integrated field synchronizing signal when the attenuator 21 is operative.

The synchronizing pulses 24 and 25 are shown as positive going for the sake of simplicity, in order to illustrate that in each case the beginning of a fly-back of the sawtooth signal is initiated when either the curve 24 or the curve 25 intersects the curve 23. As previously mentioned, the integrated field synchronizing pulses are actually negative going.

If the frequency of the field synchronizing signal has the nominal value, the beginning of the fly-back of the sawtooth voltage is initiated about halfway between the moments $t_1$ and $t_2$, where $t_2-t_1$ represents the duration of a field synchronizing pulse. Assuming, for example, that this nominal frequency is 50 c./s., but that differences of from 48–52 c./s. may occur. The beginning of the fly-back is then shifted more towards the moment $t_1$ as the frequency deviation of the picture synchronizing signal more approaches the 48 c./s., and shifted more towards the moment $t_2$ if the frequency deviation more approaches the 52 c./s.

FIG. 3 illustrates the case where the frequency of the field synchronizing signal is exactly 50 c./s. and the beginning of the fly-back thus lies approximately halfway between $t_1$ and $t_2$. In order to permit direct synchronization the natural frequency of the oscillator 14 is always required to be lower than that of the field synchronizing signal and must therefore be lower than 48 c./s. This natural frequency is determined by line 26 in FIG. 3, that is to say, by the potential to which the anode voltage of the pentode used in the Miller-Transitron oscillator circuit can drop before the fly-back begins.

When the attenuator 21 is inoperative, for example a short time after a state of non-synchronization has been converted to a state of synchronization, the non-attenuated pulses 24 are active which fluctuate about a mean value represented by line 26. According as the time proceeds, an output voltage built up at the smoothing network 16 shifts line 26 upwards to the level indicated by line 27 so that, without synchronizing pulses, the beginning of the fly-back would be initiated at the moments $t_4$ instead of at the moments $t_3$. In other words, the natural frequency of the oscillator 14 has apparently increased so that at the same time the synchronizing pulses may be attenuated by the attenuator 21 until in the state of balance the pulses 25 occur which fluctuate about an average value represented by line 27. FIG. 4, in which corresponding curves and lines are numbered as in FIG. 3, shows a condition in which the frequency deviation is greater than in the case of FIG. 3 and in which the frequency of the field synchronizing signal is, for example, 51.9 c./s. This results in line 26 being shifted upwards to a level above that indicated by line 27, that is to say, the level represented by the line 28, so that the apparent natural frequency of the oscillator 14 is increased still further due to the beginning of the fly-back without synchronizing pulses now occurring at the moments $t_5$, which are located before the moments $t_4$.

In order to enable line 26 to be shifted to the higher level 28, the beginning of the fly-back, which is initiated either by the non-attenuated pulses 24 or by the attenuated pulses 25, must be displaced more towards the moment $t_2$, since otherwise the duration of the output pulses of 13 does not increase and hence a higher voltage at the output terminals of 16 cannot be built up.

From this it follows that, for very large deviations in frequency, the fly-back always begins substantially at the top of a synchronizing pulse.

If, due to an external interference, one or more synchronizing pulses disappear, then in the case of a large frequency difference, the synchronizing pulse first occurring after such disappearance is not capable of immediately restoring the state of synchronization, but several periods must pass before the direct synchronization is possible again.

This is clarified further in the right-hand half of FIG. 4 in which the third pulse of the pulse series 25 is omitted. The amplitude of the fourth pulse, which is shown again, has no point of intersection with the curve 23 so that direct synchronization cannot take place. The fifth pulse is shifted in phase still further with respect to the sawtooth signal and only after several periods can a pulse 25 again intersect the curve 23 so that direct synchronization can be restored. The picture shown thus rolls as it were over the viewing screen from the moment when the synchronization is restored.

If, however, the fly-back would always be initiated by the direct synchronization half-way between the moments $t_1$ and $t_2$ or at a moment nearer $t_1$, then in case of disappearance of a synchronizing pulse the possibility of the first pulse occurring not restoring the synchronization would become much smaller since the reverse available is larger. This may be seen, for example, from the right-hand half of FIG. 3 wherein likewise one synchronizing pulse has fallen out and nevertheless the next-following pulse immediately restores the direct synchronization.

On principle, the draw-back might be overcome by attenuating the pulses 25 to a lesser extent. However, if the difference in frequency between synchronizing signal and oscillator signal is small (for example natural frequency of oscillator is 47 c./s. and frequency of synchronizing signal is 48 c./s.), the beginning of the fly-back initiated by the synchronizing pulse will thus be shifted more towards the moment $t_1$ than would be the case with a less great amplitude.

Since the moment of the beginning of the fly-back in this case closely approaches the line 26, which is shifted only to a small extent in the direction of a higher level, very small interferences (noise components, for example), for which the level of the upwards shifted line 26 is likewise to be considered as a mean value, are also capable of initiating the beginning of the fly-back before the direct synchronising pulses can do so.

From the foregoing it follows that it is desirable not to provide the moment of the beginning of the fly-back too near the moment $t_1$ or the moment $t_2$.

In the circuit arrangement according to the invention, this is achieved by adding the whole or part of the direct voltage produced by the line phase detector 2 to the direct voltage produced by the field phase detector 13. It is thus possible for the level to which line 26 is shifted up to be displaced above or below the level determined by the phase detector 13.

When the phase difference between the sawtooth signal and the pulsatory signal is represented by $\gamma$ and if $\gamma=0$, if the beginning of the fly-back occurs at the moment $t_1$, and if $\phi=\phi_{max}$ if this takes place at the moment $t_2$, then in one preferred embodiment of a circuit arrangement according to the invention a portion of the voltage of the line phase detector 2 is applied to the network 16 belonging to the field phase detector 13, such that, for any frequency deviations occurring, the beginning of the fly-back always occurs in a range comprised between ¼ and $\frac{1}{3}\phi_{max}$.

In this manner there is a fairly great security that, on the one hand, rolling of the picture is impossible if one or more field synchronizing pulses fall out, and, on the other hand, unwanted beginning of the fly-back as a result of small interferences is avoided. Interference with great amplitude can hardly occur owing to further steps taken in the television receiver. In addition, the step described affords the advantage that, since the displacement of the beginning of the fly-back due to variations in the field synchronizing signal has been brought inside the said range of phases, any possible drift of the field oscillator occurring in limiting cases, no longer causes difficulty since outside this range of phases a reverse is still available for neutralizing the drift of the oscillator.

It will be evident that the advantages of the supply of the voltage obtained from the line phase detector 2 to the smoothing network 16 are limited not only to the full state of synchronization of the field synchronizing device.

If the reference voltage obtained from the line phase detector 2 is applied directly to the oscillator 14 via a separate smoothing network having a constant time much smaller than that of the network 16, then the natural frequency of the oscillator 14 can already be slightly controlled upon establishing synchronization. If the amplitude of the non-attenuated field synchronizing pulses is too small for establishing direct synchronization, the oscillator may be controlled with the assistance of the voltage of the line phase detector to an extent such that direct synchronization is possible.

FIG. 2 shows a possible wiring diagram of a circuit arrangement as shown in block form in FIG. 1. The line synchronizing pulses 1 are supplied to a phase detector 2 comprising two diodes 29 and 30 and resistors 31 and 32 connected parallel thereto. The two diodes have supplied to them two sawtooth reference signals obtained from signal sources 33 and 34 via capacitors 35 and 36. These reference signals are in phase opposition so that a symmetrical phase detector is obtained. The direct voltage produced by phase detector 2 is applied via smoothing network 5 to the reactance circuit 6 which controls the sine oscillator 4. The signal sources 33 and 34 are diagrammatic indications of circuits covering a signal obtained from the sine oscillator 4 into a reference signal of desired form and phase.

The line synchronizing pulses 1 are also supplied to the control grid of a tube 37, associated with the coincidence detector 9, and to the control grid of a tube 38 associated with the gate circuit 8. In addition, line fly-back pulses 39 are supplied to the anode of tube 37. They may be obtained from the line output transformer included in the anode circuit of the line output tube. This output tube is controlled by a signal derived from the oscillator 4.

In the case of coincidence between the pulses 1 and 39, tube 37 conveys current and tube 38 is cut off. If there is no coincidence between these pulses, tube 38 is open and the synchronizing pulses 1 are supplied for direct synchronization to the oscillator 4.

From point 40 a connection is established via a resistor 41 to the smoothing network 16 of the field phase detector 13. This smoothing network comprises an electrolytic capacitor 42 and a resistor 43 connected parallel thereto. The time constant of smoothing network 16 is very large, in order to obtain a satisfactory flywheel action of the field synchronizing device. The ratio between the resistors 41 and 43 is chosen so that precisely that portion of the voltage produced by the phase detector 2 is added to the voltage set up across 16 which is necessary for adjusting the desired range of phases from ¼ to $\frac{1}{3}\phi_{max}$.

The line phase detector 2 is designed symmetrically so that it can deliver a positive or a negative voltage according as the frequency of the line synchronizing signal and the field synchronizing signal deviates to one side or the other from the nominal line-and-field frequency. The phase detector 13 is asymmetrical and, in operation, always delivers a negative voltage. This implies that, if the frequency deviates to a value higher than the nominal frequency, the negative output of the field phase detector 13 must be increased and, if the frequency deviates to a value lower than the nominal frequency, the negative output voltage must be reduced. This assists in holding the phase in the range from ¼ to $\frac{1}{3}\phi_{max}$. In the case of a small frequency difference between the field synchronizing signal and the field oscillator signal, a somewhat greater phase difference is required, since the negative direct voltage produced by the field phase detector 13 is decreased by the voltage of the line phase detector 2. For large frequency difference, however, the negative voltage of 13 is increased so that a smaller phase difference is required.

The operation of the field synchronizing device shown in FIG. 2 is otherwise evident. It is to be mentioned only that the combined direct voltage of line phase detector and field phase detector is applied via a resistor 44 to the suppressor grid of a pentode 45 which forms part of the Miller-Transitron oscillator 14. If, for example, a blocking oscillator or a multivibrator would be used as the relaxation oscillator, the foregoing holds good without restriction, but the polarities of the voltages delivered by the phase detectors 2 and 13 must be adapted correspondingly, as well as the polarity of the field synchronizing pulses.

The coincidence detector 22 contains a tube 46, the control grid of which has the field synchronizing pulses 12 supplied to it. Pulses 47 which occur at the time of the fly-back of the picture are supplied to the anode of tube 46. These pulses are obtained by differentiating the sawtooth signal obtained from 14 by means of a capacitor 48 and a resistor 49. According as the coincidence between the pulses 12 and 47 is better, the attenuator 21 more attenuates the pulses integrated in 19.

It will be evident that, according as a less sensitive relaxation oscillator is used, the voltage derived from the line phase detector must be higher than in the case above described. It may then be necessary under certain conditions that not only the full voltage produced by phase detector 2 is utilized, but this voltage is even amplified for attaining the envisaged object.

What is claimed is:

1. In a television receiver, a source of line synchronizing signals and field synchronizing signals, a line deflecting system comprising a line oscillator, means comparing said line synchronizing signals and the output of said line oscillator to provide a first direct control voltage, and means applying said first control voltage to said line oscillator to control the frequency thereof, a field deflecting system comprising a field oscillator, means comparing said field synchronizing signals and the output of said field oscillator to provide a second direct control voltage, and means applying said second control voltage to said field oscillator to control the frequency thereof, and auxiliary means for controlling the frequency of said field oscillator comprising means applying said first control voltage to said field deflecting system.

2. In a television receiver, a source of line synchronizing signals and field synchronizing signals, a line deflecting system comprising a line oscillator, means comparing said line synchronizing signals and the output of said line oscillator to provide a first direct control voltage, and means applying said first control voltage to said line oscillator to control the frequency thereof, a field deflecting system comprising a field oscillator, means comparing said field synchronizing signals and the output of said field oscillator to provide a second direct control voltage, means for applying said second control voltage to said field oscillator to control the frequency thereof, means for variably attenuating said field synchronizing signals as a function of the phase difference between said field synchronizing signals and the output of said field oscillator, means applying the attenuated signals to said field oscillator to provide direct synchronization thereof, and auxiliary means for controlling said field oscillator comprising means applying said first control voltage to said field oscillator.

3. In a television receiver, a source of line synchronizing signals and field synchronizing signals, a line deflecting system comprising a line oscillator, means comparing said line synchronizing signals and the output of said line oscillator to provide a first direct control voltage, and means applying said first control voltage to said line oscillator to control the frequency thereof, a field deflecting system comprising a field oscillator, means comparing said field synchronizing signals and the output of said field oscillator to provide a second direct control voltage, means for applying said second control voltage to said field oscillator to control the frequency thereof, means for variably attenuating said field synchronizing signals, coincidence circuit means responsive to said field synchronizing signals and the output of said field oscillator connected to control said attenuating means, means applying the attenuated signals to said field oscillator to provide direct synchronization thereof, and auxiliary means for controlling said field oscillator comprising means applying said first control voltage to said field oscillator.

References Cited in the file of this patent

UNITED STATES PATENTS

| | | |
|---|---|---|
| 2,672,510 | Enslein | Mar. 16, 1954 |
| 2,750,498 | Arbuckle | June 12, 1956 |
| 2,808,454 | Vilkomerson | Oct. 1, 1957 |